United States Patent
Kahsar et al.

(10) Patent No.: US 10,781,393 B2
(45) Date of Patent: Sep. 22, 2020

(54) DISPERSANTS FOR LUBRICATING OIL COMPOSITIONS

(71) Applicant: Infineum International Limited, Abingdon (GB)

(72) Inventors: Laura A. Kahsar, Rahway, NJ (US); Keith R. Gorda, Little York, NJ (US)

(73) Assignee: Infineum International Limited (GB)

( * ) Notice: Subject to any disclaimer, the term of this patent is extended or adjusted under 35 U.S.C. 154(b) by 0 days.

(21) Appl. No.: 16/233,528

(22) Filed: Dec. 27, 2018

(65) Prior Publication Data

US 2020/0208072 A1 Jul. 2, 2020

(51) Int. Cl.
*C10M 149/22* (2006.01)
*C08G 81/02* (2006.01)
*C10M 169/04* (2006.01)
*C10N 40/04* (2006.01)

(52) U.S. Cl.
CPC ......... *C10M 149/22* (2013.01); *C08G 81/024* (2013.01); *C10M 169/041* (2013.01); *C10M 2203/003* (2013.01); *C10M 2217/046* (2013.01); *C10N 2040/042* (2020.05)

(58) Field of Classification Search
CPC .......... C10M 2215/04; C10M 2215/08; C10M 2215/26; C10M 2217/06; C10M 133/56; C10M 149/22; C10M 169/041; C10M 2217/046; C10M 2215/28; C10M 2203/00; C10M 2205/028; C10M 2205/06; C10N 2230/54; C10N 2230/06; C10N 2210/06; C10N 2240/042; C10N 2270/02; C10N 2030/06; C10N 2040/042; C08G 81/024

See application file for complete search history.

(56) References Cited

U.S. PATENT DOCUMENTS

| | | |
|---|---|---|
| 2,719,125 A | 9/1955 | Roberts |
| 2,719,126 A | 9/1955 | Fields et al. |
| 2,760,933 A | 8/1956 | Fields et al. |
| 2,836,564 A | 5/1958 | Roberts et al. |
| 3,087,937 A | 4/1963 | Tesi et al. |
| 3,663,561 A | 5/1972 | Blaha |
| 4,259,194 A | 3/1981 | deVries et al. |
| 4,259,195 A | 3/1981 | King et al. |
| 4,261,843 A | 4/1981 | King et al. |
| 4,263,152 A | 4/1981 | King et al. |
| 4,265,773 A | 5/1981 | deVries et al. |
| 4,272,387 A | 6/1981 | King et al. |
| 4,283,295 A | 8/1981 | deVries et al. |
| 4,285,822 A | 8/1981 | deVries et al. |
| 5,185,090 A | 2/1993 | Ryer et al. |
| 5,242,612 A | 9/1993 | Ryer et al. |
| 9,340,746 B1 | 5/2016 | Henly et al. |
| 2007/0287643 A1 | 12/2007 | Matsui et al. |
| 2012/0264665 A1 | 10/2012 | Wu et al. |
| 2013/0005624 A1* | 1/2013 | Kamano ............. C10M 141/08 508/258 |
| 2017/0015931 A1* | 1/2017 | Watts ................. C10M 141/10 |

FOREIGN PATENT DOCUMENTS

| | | |
|---|---|---|
| EP | 3118285 A1 | 1/2017 |
| WO | 9406897 A1 | 3/1994 |
| WO | 2007011462 A1 | 1/2007 |

OTHER PUBLICATIONS

C.V. Smallheer etc., Lubricant Additives, 1967, p. 1-11, The Lezius-Hiles Co., Cleveland, Ohio.

* cited by examiner

*Primary Examiner* — Vishal V Vasisth

(57) ABSTRACT

A lubricating oil composition comprises a major amount of an oil of lubricating viscosity and a minor amount of an unsymmetrical bis-succinimide, or a mixture of unsymmetrical bis-succinimides, of the structure (I):

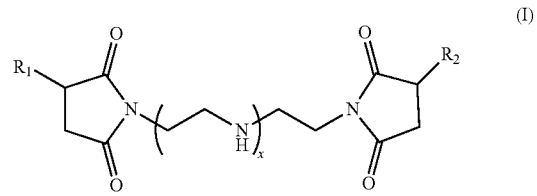

wherein one of $R_1$ and $R_2$ is a polyisobutylene group having a weight average molecular weight of 400 to 5,000, as determined by GPC with reference to linear polystyrene standards, and the other of $R_1$ and $R_2$ is a hydrocarbon group made by the metallocene-catalysed polymerisation of an α-olefin feedstock; and x is from 1 to 10 and is the same for all molecules of structure (I), or an average of all molecules of structure (I) in a mixture of molecules of structure (I).

20 Claims, No Drawings

DISPERSANTS FOR LUBRICATING OIL COMPOSITIONS

The present invention provides improved dispersants for use as additives in lubricating oil compositions, to lubricating oil compositions containing the dispersants, and to a method of making the dispersants. The dispersants have been found to be particularly suitable for use in automotive transmission fluid compositions where good frictional properties have been observed compared to conventional dispersants. Additionally, higher fatigue lifetimes have been observed compared to conventional dispersants.

For many years, bis-succinimides of the formula:

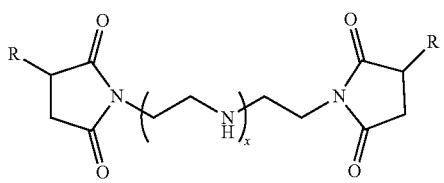

have been used as dispersants for lubricating compositions of various types, including automotive transmission fluid compositions. They are conventionally formed by reacting maleic anhydride with an unsaturated hydrocarbon to form a hydrocarbyl-substituted succinic anhydride with is then reacted with a polyalkylene polyamine to form the bis-succinimide. Most commonly, the unsaturated hydrocarbon is a polyalkene, typically polyisobutylene (PIB). Depending on the intended use, the molecular weight of the PIB can range from about 400 to about 5,000, typically about 400 to about 2,300.

It is also known to use unsaturated hydrocarbons other than PIB. For example, US 2012/02646155 A1 describes molecules where polyalphaolefins (PAO), for example those formed from alphaoletins preferably having about 8 to 12 carbon atoms, are used to provide groups R in the structure above. Advantages have been reported by making use of polyalphaolefins which are formed by metallocene catalysis. These are sometimes referred to as 'mPAO'.

Common to both of these approaches is that, with reference to the structure above, both groups R are the same. That is, the bis-succinimide is symmetrical. The present invention is based on the observation that un-symmetrical bis-succinimides, that is where groups R are not the same, bring certain advantageous properties when used as additives in lubricating compositions, particularly automatic transmission fluid compositions.

Accordingly, in a first aspect, the present invention provides a lubricating oil composition comprising a major amount of an oil of lubricating viscosity and a minor amount of an unsymmetrical bis-succinimide, or a mixture of unsymmetrical bis-succinimides, of the structure (I):

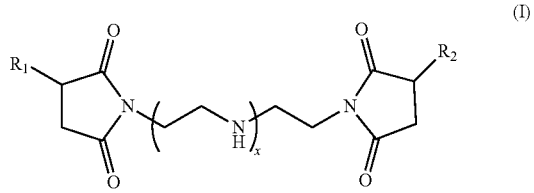

wherein one of $R_1$ and $R_2$ is a polyisobutylene group having a number average molecular weight of 400 to 5,000, as determined by GPC with reference to linear polystyrene standards, and the other of $R_1$ and $R_2$ is a hydrocarbon group made by the metallocene-catalysed polymerisation of an α-olefin feedstock, and wherein x is from 1 to 10 and is the same for all molecules of structure (I) or an average of all molecules of structure (I) in a mixture of molecules of structure (I).

The hydrocarbon group made by the metallocene-catalysed polymerisation of an α-olefin feedstock, hereinafter the 'mPAO', is prepared by polymerisation in the presence of an activated metallocene catalyst as described for example in WO2007/011462 A1. The mPAO can be prepared from any one or two or more α-olefins containing 3 to 24 carbon atoms. When a single α-olefin is used, it is preferred to use a $C_3$ to $C_{18}$ linear α-olefin, preferably a $C_6$ to $C_{14}$ linear α-olefin, more preferably a $C_8$ to $C_{12}$ linear α-olefin. When a mixture of α-olefins is used, it is preferred to use a mixture comprising $C_3$ to $C_{18}$ linear α-olefins, preferably a $C_6$ to $C_{14}$ linear α-olefins, more preferably a $C_8$ to $C_{12}$ linear α-olefins. The mixture of α-olefins preferably has a composition such that the average carbon chain length of the mixture is greater than 4. For example, by calculating the number of moles of each compound present, a mixture of 50 mass % of 1-butene and 50 mass % of 1-pentene has an average carbon chain length of 4.4. More preferably, the average carbon chain length of the mixture is greater than 4.5, for example, greater than 6.5. Preferably, the average carbon chain length of the mixture is no greater than 14 and more preferably no greater than 10.5. Suitably, the average carbon chain length of the mixture is from 4.5 to 10.5.

Suitably the α-olefin feedstock comprises 1-butene, 1-pentene, 1-hexene, 1-heptene, 1-octene, 1-nonene, 1-decene, 1-undecene, 1-dodecene, 1-tetradecene and 1-octadecene and any mixtures of two or more of these α-olefins.

In a preferred embodiment, the α-olefin feedstock comprises 1-octene, 1-decene, 1-dodecene or any mixture thereof. More preferably, the α-olefin feedstock consists essentially of 1-octene, 1-decene, 1-dodecene or any mixture thereof.

Preferably, the hydrocarbon group made by the metallocene-catalysed polymersiation of an α-olefin feedstock has a number average molecular weight of 300 to 20,000, preferably 400 to 5,000, more preferably 500 to 3000, as determined by GPC with reference to linear polystyrene standards.

Preferably, the polyisobutylene group has a number average molecular weight of 400 to 4,000, preferably 400 to 2,500, for example 950, as determined by GPC with reference to linear polystyrene standards.

In preferred embodiments, x is 1, 2, 3 or 4. In an alternative preferred embodiment, x is from 5 to 8, and is preferably an average of all molecules of structure (I) in a mixture of molecules of structure (I).

Bis-succinimide dispersants are conventionally made by first reacting an unsaturated hydrocarbon with maleic anhydride to form a hydrocarbyl-substituted succinic anhydride. The hydrocarbyl-substituted succinic anhydride is then reacted with a polyethylene polyamine to form the bis-succinimide. In the present invention, two different hydrocarbyl-substituted succinic anhydrides are formed or provided, one where the hydrocarbyl substituent is a polyisobutylene group and another where the hydrocarbyl substituent is a hydrocarbon group made by the metallocene-catalysed polymerisation of an α-olefin feedstock. This may be simply a mixture of each type of hydrocarbyl-substituted succinic anhydride where each has first been separately synthesised but more preferably is a mixture formed by reacting maleic anhydride with a mixture of an unsaturated polyisobutylene and a polymer formed from a metallocene-catalysed polymerisation of an α-olefin feedstock. The resulting mixture of an unsaturated polyisobutylene-substituted succinic anhydride and a succinic anhydride substituted by a polymer formed from a metallocene-catalysed polymerisation of an α-olefin feedstock is then reacted with a polyethylene polyamine. The product obtained is thus a mixture containing unsymmetrical bis-succinimides of structure (I) together with symmetrical bis-succinimides where both hydrocarbyl substituents are PIB and symmetrical bis-succinimides where both hydrocarbyl substituents are mPAO. The relative amounts of each type of molecule will depend on the respective amounts of each hydrocarbyl-substituted succinic anhydride in the mixture which is reacted with the polyethylene polyamine. It will be understood that, in order to maximise the proportion of the compounds of structure (I) present in the final reaction product, the mixture of the unsaturated polyisobutylene and the polymer formed from a metallocene-catalysed polymerisation of an α-olefin feedstock should contain equal molar quantities of each type of molecule. The unsymmetrical bis-succinimides may be separated from the mixture of unsymmetrical and symmetrical molecules in the final product but this is usually unnecessary. Preferably, the mixture containing the unsymmetrical bis-succinimides is used without further purification.

In accordance with a second aspect, the present invention provides a method of making an unsymmetrical bis-succinimide, or a mixture of unsymmetrical bis-succinimides, of the structure (I):

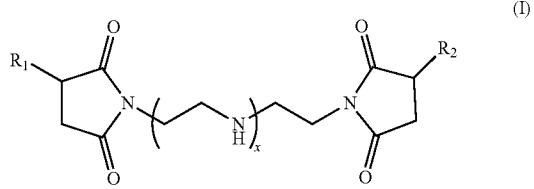

(I)

wherein one of $R_1$ and $R_2$ is a polyisobutylene group having a number average molecular weight of 400 to 5,000, as determined by GPC with reference to linear polystyrene standards, and the other of $R_1$ and $R_2$ is a hydrocarbon group made by the metallocene-catalysed polymerisation of an α-olefin feedstock, and wherein x is from 1 to 10 and is the same for all molecules of structure (I) or an average of all molecules of structure (I) in a mixture of molecules of structure (I);

the method comprising:
(a) forming or otherwise providing a mixture of (i) a polyisobutenyl-substituted succinic anhydride, the polyisobutylene group having a number average molecular weight of 400 to 5,000, as determined by GPC with reference to linear polystyrene standards, and (ii) a hydrocarbyl-substituted succinic anhydride where the hydrocarbyl substituent is a hydrocarbon group made by the metallocene-catalysed polymerisation of an α-olefin feedstock;
(b) reacting the mixture from step (a) with a polyethylene polyamine or a mixture of polyethylene polyamines.

The feedstock used to form reactant (a)(ii) is as defined in the first aspect and preferred feedstocks are those defined as preferred in relation to the first aspect.

Preferably, the hydrocarbon group made by the metallocene-catalysed polymersiation of an α-olefin feedstock has a number average molecular weight of 300 to 20,000, preferably 400 to 5,000, more preferably 500 to 3000, as determined by GPC with reference to linear polystyrene standards.

Preferably, the polyisobutylene group has a number average molecular weight of 400 to 4,000, preferably 400 to 2,500, for example 950, as determined by GPC with reference to linear polystyrene standards.

Preferably in step (a), the mixture of component (i) and component (ii) contains equal molar quantities of (i) and (ii).

Preferably the polyethylene polyamine used in step (b) is diethylene triamine, triethylene tetramine, tetraethylene pentamine, pentaethylene hexamine or any mixture thereof. Alternatively, the polyethylene polyamine used in step (b) has 5 to 8 nitrogen atoms or preferably is a mixture of polyethylene polyamines where the average number of nitrogen atoms of the molecules forming the mixture is from 5 to 8. Such mixtures are commercially available and are commonly referred to as PAM. Mixtures where the average number of nitrogen atoms is higher than 8, commonly referred to as H-PAM, are also available and may alternatively be used.

Preferably, the unsymmetrical bis-succinimide of the structure (I) is present in the lubricating oil composition in an amount of from 0.01 to 20% by mass, based on the mass of the composition, more preferably 0.05 to 10% by mass, for example 0.5 to 5% by mass. When a mixture of unsymmetrical bis-succinimides is used, these amounts are the total amounts by mass of all the molecules of structure (I) present in the lubricating oil composition.

In a preferred embodiment, the lubricating oil composition is an automatic transmission fluid. As is known in the art, automatic transmissions include conventional automatic transmissions, continuously variable transmissions and dual-clutch transmissions. In this specification, reference to an automatic transmission fluid will be understood to mean a transmission fluid suitable to lubricate all these types of transmissions. Additionally, fluids for the lubrication of transmissions used in electric and hybrid-electric vehicles (sometimes known as EV fluids) are also to be understood in the context of the present invention as automatic transmission fluids. In another embodiment, the lubricating oil composition is a manual transmission fluid, that is a lubricant suitable for the lubrication of a manual transmission of any type.

In a preferred embodiment, the lubricating oil composition comprises one or more co-additives, as described hereinbelow, in addition to the unsymmetrical bis-succinimide of the structure (I).

In accordance with a third aspect, the present invention provides a method of increasing the fatigue lifetime between two or more contacting surfaces moving relative to one another, the method comprising lubricating the contacting surfaces with a lubricating oil composition according to the first aspect.

In accordance with a fourth aspect, the present invention provides the use of an unsymmetrical bis-succinimide as defined in relation to the first aspect, or obtained by the method of the second aspect, as an additive in a lubricating oil composition to increase the fatigue lifetime between two or more contacting surfaces moving relative to one another where the contacting surfaces are lubricated by the composition.

Preferably, in relation to the third and fourth aspects, the contacting surfaces are both or all metallic, for example steel. Preferably the two or more contacting surfaces moving relative to one another are the surfaces of bearings, races, gears or other moving parts of a vehicle transmission, engine or machine.

The oil of lubricating viscosity may be any suitable lubricating oil as known in the art. Suitable oils are those derived from natural lubricating oils, synthetic lubricating oils, and mixtures thereof.

The oil of lubricating viscosity may be any suitable viscosity but preferable are oils with low viscosities. Typically, the oil of lubricating viscosity will have a kinematic viscosity 20 mm$^2$/s (cSt) at 40° C. or less. Preferred oils of lubricating viscosity have kinematic viscosities of from 20 to 10 mm$^2$/s (cSt) at 40° C., for example in the range from 14 to 15 mm$^2$/s (cSt) at 40° C.

Natural lubricating oils include animal oils, vegetable oils (e.g., castor oil and lard oil), petroleum oils, mineral oils, and oils derived from coal or shale. The preferred natural lubricating oil is mineral oil.

Suitable mineral oils include all common mineral oil basestocks. This includes oils that are naphthenic or paraffinic in chemical structure. Oils that are refined by conventional methodology using acid, alkali, and clay or other agents such as aluminum chloride, or they may be extracted oils produced, for example, by solvent extraction with solvents such as phenol, sulfur dioxide, furfural, dichlordiethyl ether, etc. They may be hydrotreated or hydrofined, dewaxed by chilling or catalytic dewaxing processes, or hydrocracked. The mineral oil may be produced from natural crude sources or be composed of isomerized wax materials or residues of other refining processes.

Synthetic lubricating oils include hydrocarbon oils and halo-substituted hydrocarbon oils such as oligomerized, polymerized, and interpolymerized olefins [e.g., polybutylenes, polypropylenes, propylene, isobutylene copolymers, chlorinated polylactenes, poly(1-hexenes), poly(1-octenes), poly-(1-decenes), etc., and mixtures thereof]; alkylbenzenes [e.g., dodecyl-benzenes, tetradecylbenzenes, dinonyl-benzenes, di(2-ethylhexyl)benzene, etc.]; polyphenyls [e.g., biphenyls, terphenyls, alkylated polyphenyls, etc.]; and alkylated diphenyl ethers, alkylated diphenyl sulfides, as well as their derivatives, analogs, and homologs thereof, and the like.

The preferred oils from this class of synthetic oils are Group IV basestocks, i.e. polyalphaolefins (PAO), including hydrogenated oligomers of an alpha-olefin, particularly oligomers of 1-decene, especially those produced by free radical processes, Ziegler catalysis, or cationic catalysis. They may, for example, be oligomers of branched or straight chain alpha-olefins having from 2 to 16 carbon atoms, specific examples being polypropenes, polyisobutenes, poly-1-butenes, poly-1-hexenes, poly-1-octenes and poly-1-decene. Included are homopolymers, interpolymers and mixtures.

Synthetic lubricating oils also include alkylene oxide polymers, interpolymers, copolymers, and derivatives thereof where the terminal hydroxyl groups have been modified by esterification, etherification, etc. This class of synthetic oils is exemplified by: polyoxyalkylene polymers prepared by polymerization of ethylene oxide or propylene oxide; the alkyl and aryl ethers of these polyoxyalkylene polymers (e.g., methyl-polyisopropylene glycol ether having an average molecular weight of 1000, diphenyl ether of polypropylene glycol having a molecular weight of 1000-1500); and mono- and poly-carboxylic esters thereof (e.g., the acetic acid esters, mixed $C_3$-$C_8$ fatty acid esters, and $C_{12}$ oxo acid diester of tetraethylene glycol).

Another suitable class of synthetic lubricating oils comprises the esters of dicarboxylic acids (e.g., phthalic acid, succinic acid, alkyl succinic acids and alkenyl succinic acids, maleic acid, azelaic acid, suberic acid, sebasic acid, fumaric acid, adipic acid, linoleic acid dimer, malonic acid, alkylmalonic acids, alkenyl malonic acids, etc.) with a variety of alcohols (e.g., butyl alcohol, hexyl alcohol, dodecyl alcohol, 2-ethylhexyl alcohol, ethylene glycol, diethylene glycol monoethers, propylene glycol, etc.). Specific examples of these esters include dibutyl adipate, di(2-ethylhexyl) sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, and the complex ester formed by reacting one mole of sebasic acid with two moles of tetraethylene glycol and two moles of 2-ethyl-hexanoic acid, and the like. A preferred type of oil from this class of synthetic oils is adipates of $C_4$ to $C_{12}$ alcohols.

Esters useful as synthetic lubricating oils also include those made from $C_5$ to $C_{12}$ monocarboxylic acids and polyols and polyol ethers such as neopentyl glycol, trimethylolpropane pentaerythritol, dipentaerythritol, tripentaerythritol, and the like.

The oil of lubricating viscosity may be derived from unrefined, refined, rerefined oils, or mixtures thereof. Unrefined oils are obtained directly from a natural source or synthetic source (e.g., coal, shale, or tar sands bitumen) without further purification or treatment. Examples of unrefined oils include a shale oil obtained directly from a retorting operation, a petroleum oil obtained directly from distillation, or an ester oil obtained directly from an esterification process, each of which is then used without further treatment. Refined oils are similar to the unrefined oils except that refined oils have been treated in one or more purification steps to improve one or more properties. Suitable purification techniques include distillation, hydrotreating, dewaxing, solvent extraction, acid or base extraction, filtration, and percolation, all of which are known to those skilled in the art. Rerefined oils are obtained by treating used oils in processes similar to those used to obtain the refined oils. These rerefined oils are also known as reclaimed or reprocessed oils and are often additionally processed by techniques for removal of spent additives and oil breakdown products.

Another class of suitable oils of lubricating viscosity are those basestocks produced from oligomerization of natural gas feed stocks or isomerization of waxes. These basestocks can be referred to in any number of ways but commonly they are known as Gas-to-Liquid (GTL) or Fischer-Tropsch base stocks.

The oil of lubricating viscosity may be a blend of one or more of the above described oils, and a blend of natural and synthetic lubricating oils (i.e., partially synthetic) is expressly contemplated under this invention.

Preferably the lubricating oil composition comprises at least 55% by mass, based on the mass of the composition, of an oil of lubricating viscosity, more preferably at least 65% by mass, for example at least 75%, 80% or 90% by mass, based on the mass of the composition.

In this specification, the following words and expressions, if and when used, have the meanings given below:

"active ingredients" or "(a.i.)" refers to additive material that is not diluent or solvent;

"comprising" or any cognate word specifies the presence of stated features, steps, or integers or components, but does not preclude the presence or addition of one or more other features, steps, integers, components or groups thereof.

The expressions "consists of" or "consists essentially of" or cognates may be embraced within "comprises" or any cognate word. The expression "consists essentially of" permits inclusion of substances not materially affecting the characteristics of the composition to which it applies. The expression "consists of" or cognates means only the stated features, steps, integers components or groups thereof are present to which the expression refers;

"hydrocarbyl" means a chemical group of a compound that contains hydrogen and carbon atoms and that group is bonded to the remainder of the compound directly via a carbon atom. The group may contain one or more atoms other than carbon and hydrogen provided they do not affect the essentially hydrocarbyl nature of the group. Those skilled in the art will be aware of suitable groups (e.g., halo, especially chloro and fluoro, amino, alkoxyl, mercapto, alkylmercapto, nitro, nitroso, sulfoxy, etc.). Preferably, the hydrocarbyl group consists essentially of hydrogen and carbon atoms, unless specified otherwise. More preferably, the hydrocarbyl group consists of hydrogen and carbon atoms, unless specified otherwise. Preferably, the hydrocarbyl group is an aliphatic hydrocarbyl group. The term "hydrocarbyl" includes "alkyl", "alkylene", "alkenyl", "allyl" and "aryl";

"alkyl" means a $C_1$ to $C_{30}$ alkyl group which is bonded to the remainder of the compound directly via a single carbon atom. Unless otherwise specified, alkyl groups may, when there are a sufficient number of carbon atoms, be linear (i.e. unbranched) or branched, be cyclic, acyclic or part cyclic/acyclic. Preferably, the alkyl group comprises a linear or branched acyclic alkyl group. Representative examples of alkyl groups include, but are not limited to, methyl, ethyl, n-propyl, iso-propyl, n-butyl, sec-butyl, iso-butyl, tert-butyl, n-pentyl, iso-pentyl, neo-pentyl, hexyl, heptyl, octyl, dimethyl hexyl, nonyl, decyl, undecyl, dodecyl, tridecyl, tetradecyl, pentadecyl, hexadecyl, heptadecyl, octadecyl, nonadecyl, icosyl and triacontyl;

"alkylene" is synonymous with "alkanediyl" and means a $C_2$ to $C_{20}$, preferably a $C_2$ to $C_{10}$, more preferably a $C_2$ to $C_6$ bivalent saturated acyclic aliphatic hydrocarbon radical derived from an alkane by removal of a hydrogen atom from two different carbon atoms; it may be linear or branched. Representative examples of alkylene include ethylene (ethanediyl), propylene (propanediyl), butylene (butanediyl), isobutylene, pentylene, hexylene, heptylene, octylene, nonylene, decylene, 1-methyl ethylene, 1-ethyl ethylene, 1-ethyl-2-methyl ethylene, 1,1-dimethyl ethylene and 1-ethyl propylene;

"poly(alkylene)" is synonymous with "poly(alkene)" and means a polymer containing the appropriate alkanediyl repeating group. Such polymers may be formed by polymerization of the appropriate alkene (e.g. polyisobutylene may be formed by polymerizing isobutene);

"poly(alkylenyl)" is synonymous with "poly(alkenyl)" and means a polymer substituent group containing the appropriate alkanediyl repeating radical. Suitably, the poly (alkylenyl) substituent group may be formed by reacting the corresponding poly(alkylene) with a reactant (such as maleic anhydride) which introduces a succinic anhydride group onto the poly(alkylene);

"alkenyl" means a $C_2$ to $C_{30}$, preferably a $C_2$ to $C_{12}$, group which includes at least one carbon to carbon double bond and is bonded to the remainder of the compound directly via a single carbon atom, and is otherwise defined as "alkyl";

"alkynyl" means a $C_2$ to $C_{30}$, preferably a $C_2$ to $C_{12}$, group which includes at least one carbon to carbon triple bond and is bonded to the remainder of the compound directly via a single carbon atom, and is otherwise defined as "alkyl";

"aryl" means a $C_6$ to $C_{18}$, preferably $C_6$ to $C_{10}$, aromatic group, optionally substituted by one or more alkyl, halo, hydroxyl, alkoxy and amino groups, which is bonded to the remainder of the compound directly via a single carbon atom. Preferred aryl groups include phenyl and naphthyl groups and substituted derivatives thereof, especially phenyl and alkyl substituted derivatives thereof;

"alkanol" means an alcohol which consists of an alkyl chain having one or more hydroxyl functional groups bonded to carbon atom(s) of the alkyl chain. The term "alkanol" embraces monohydric alkanols such as methanol, ethanol, propanol and butanol, but also polyhydric alkanols;

"polyhydric alkanol" means an alkanol which includes two or more hydroxyl functional groups. More specifically, the term "polyhydric alkanol" embraces a diol, triol, tetrol, and/or related dimers or chain extended polymers of such compounds. Even more specifically, the term "polyhydric alkanol" embraces glycerol, neopentyl glycol, trimethylolethane, trimethylolpropane, trimethylolbutane, pentaerythritol, dipentaerythritol, tripentaerythritol and sorbitol, especially glycerol;

"monocarboxylic acid" means an organic acid, preferably a hydrocarbyl carboxylic acid, which includes a single carboxylic acid functional group;

"aliphatic hydrocarbyl fatty acid" means a monocarboxylic acid having an aliphatic $C_5$ to $C_{29}$, preferably $C_7$ to $C_{29}$, more preferably a $C_9$ to $C_{27}$, most preferably a $C_{11}$ to $C_{23}$ hydrocarbyl chain. Such compounds may be referred to herein as aliphatic ($C_5$ to $C_{29}$), preferably ($C_7$ to $C_{29}$), more preferably ($C_9$ to $C_{27}$), most preferably ($C_{11}$ to $C_{23}$) hydrocarbyl monocarboxylic acid(s) or hydrocarbyl fatty acid(s) (wherein $C_x$ to $C_y$ designates the total number of carbon atoms in the aliphatic hydrocarbyl chain of the fatty acid, the fatty acid itself due to the presence of the carboxyl carbon atom includes a total of $C_{x+1}$ to $C_{y+1}$ carbon atoms). Preferably, the aliphatic hydrocarbyl fatty acid, inclusive of the carboxyl carbon atom, has an even number of carbon atoms. The aliphatic hydrocarbyl chain of the fatty acid may be saturated or unsaturated (i.e. includes at least one carbon to carbon double bond); preferably, the aliphatic hydrocarbyl chain is unsaturated and includes at least one carbon to carbon double bond— such fatty acids may be obtained from natural sources (e.g. derived from animal or vegetable oils) and/or by reduction of the corresponding saturated fatty acid;

"aliphatic hydrocarbyl fatty acid ester" means an ester wherein the monocarboxylic acid functional group of the aliphatic hydrocarbyl fatty acid, as defined herein, has been converted into an ester group. For example, an aliphatic hydrocarbyl fatty acid ester may be obtained by reacting the corresponding aliphatic hydrocarbyl fatty acid, or reactive derivative thereof (e.g. anhydride or acid halide) with an alkanol, as defined herein. Alternatively, or additionally, the aliphatic hydrocarbyl fatty acid ester may be obtained in its natural form e.g. as an aliphatic hydrocarbyl fatty acid glycerol ester. Accordingly, the term "aliphatic hydrocarbyl fatty acid ester" embraces an aliphatic hydrocarbyl fatty acid glycerol ester and also aliphatic hydrocarbyl fatty acid esters obtained by reaction of aliphatic hydrocarbyl fatty acids, or reactive derivatives thereof (e.g. anhydride or acid halide) with an alkanol;

"salicylate soap" means the amount of alkali metal or alkaline earth metal salicylate salt contributed by the one or more alkali metal or alkaline earth metal salicylate detergent(s) exclusive of any overbasing material;

"alkali metal or alkaline earth metal salicylate detergent" includes salicylate soap as defined herein and any overbasing material;

"halo" or "halogen" includes fluoro, chloro, bromo and iodo;

"oil-soluble" or "oil-dispersible", or cognate terms, used herein do not necessarily indicate that the compounds or additives are soluble, dissolvable, miscible, or are capable of being suspended in the oil in all proportions. These do mean, however, that they are, for example, soluble or stably dispersible in oil to an extent sufficient to exert their intended effect in the environment in which the oil is employed. Moreover, the additional incorporation of other additives may also permit incorporation of higher levels of a particular additive, if desired;

"ashless" in relation to an additive means the additive does not include a metal;

"ash-containing" in relation to an additive means the additive includes a metal;

"major amount" means in excess of 50 mass % of a composition expressed in respect of the stated component(s) and in respect of the total mass of the composition;

"minor amount" means less than 50 mass % of a composition expressed in respect of the stated component(s) and in respect of the total mass of the composition;

"ppm" means parts per million by mass, based on the total mass of the composition;

"metal content" of a composition or of an additive component, for example molybdenum content or total metal content of the additive concentrate (i.e. the sum of all individual metal contents), is measured by ASTM D5185;

"TBN" in relation to an additive component or of a composition, means total base number (mg KOH/g) as measured by ASTM D2896;

"KV$_{40}$" and "KV$_{100}$" mean kinematic viscosity at 40° C. and 100° C. respectively as measured by ASTM D445;

"phosphorus content" is measured by ASTM D5185;

"sulfur content" is measured by ASTM D2622;

"sulfated ash content" is measured by ASTM D874;

$M_n$ means number average molecular weight and for polymeric entities may be determined by gel permeation chromatography with reference to linear polystyrene standards;

$M_w$ means weight average molecular weight and for polymeric entities may be determined by gel permeation chromatography with reference to linear polystyrene standards.

The invention will now be described in more detail where features described herein below are to be understood as applicable to all aspects of the invention.

Co-Additives

Additives commonly found in lubricating oil compositions, including automatic transmission fluids may be included in the lubricating oil compositions of the present invention. Suitable co-additives will be known to those skilled in the art.

In a preferred embodiment where the lubricating oil composition is an automatic transmission fluid, the composition further comprises the product of an isomerized alkenyl-substituted succinic anhydride and a polyamine, the product having structure (II):

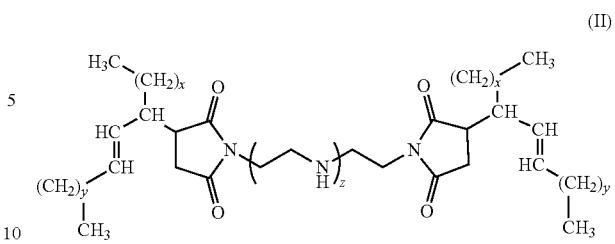

wherein x and y are independently zero or integers from 1 to 30, where x+y is from 1 to 30, and z is zero or an integer from 1 to 10.

Preferably in structure (II) above, x+y is from 8 to 15, and z is zero or an integer from 1 to 5. In a particularly preferred embodiment, x+y=13, and z is 1 or 3.

In an embodiment, reaction product is a mixture of a compound of structure (II) where z is 3 and x+y=13 and a compound of structure (II) where z is 1 and x+y=13.

Preferably, the reaction product(s) of structure (II) is present in the transmission fluid in an amount of 0.5 to 10% by mass, based on the mass of the fluid, more preferably 1 to 7% by mass, for example 2 to 5% by mass. If the reaction product is a mixture of two or more compounds of structure (II), the amount present refers to the total amount of all compounds of structure (II) present.

The reaction product of structure (II) provides advantageous friction modification properties to automatic transmission fluids. Other friction modifiers known in the art may also be included.

Other co-additives which may be present in lubricating oil compositions, including automatic transmission fluids include the following.

Ashless Dispersants

Suitable as ashless dispersants are the conventional polyisobutenyl succinimides such as those discussed hereinabove (i.e. the symmetrical bis-succinimides). As described in relation to the present invention, the formation of unsymmetrical bis-succnimides results also in the formation of symmetrical bis-succinimides so if the unsymmetrical bis-succnimides are not isolated before use, the use of additional, conventional polyisobutenyl succinimide dispersants may not be necessary. Nevertheless, additional, conventional polyisobutenyl succinimide dispersants may be used as required. Other ashless dispersants include polyisobutenyl succinamides, mixed ester/amides of polyisobutenyl-substituted succinic acid, hydroxyesters of polyisobutenyl-substituted succinic acid, and Mannich condensation products of hydrocarbyl-substituted phenols, formaldehyde and polyamines. Mixtures of these dispersants can also be used. Also suitable are the borated analogues of these dispersants.

When present, the ashless dispersant is preferably present in an amount of between 0.1 and 10% by mass based on the mass of the lubricating oil composition, preferably between 0.1 and 5% by mass, for example between 0.5 and 3% by mass. Clearly, it is possible to utilise lower amounts of additional, conventional polyisobutenyl succinimide dispersant in the case where the unsymmetrical bis-succnimides are not isolated from the reaction before use.

Oil-Soluble or Dispersible Molybdenum-Containing Compounds

The lubricating oil composition of the present invention may include one or more oil-soluble or oil-dispersible molybdenum-containing compound, preferably an organo-molybdenum compound.

Examples are molybdenum dithiocarbamates, molybdenum dithiophosphates, molybdenum dithiophosphinates, molybdenum xanthates, molybdenum thioxanthates, molybdenum sulfides, and the like, and mixtures thereof. Particularly preferred are molybdenum dithiocarbamates, molybdenum dialkyldithiophosphates, molybdenum alkyl xanthates and molybdenum alkylthioxanthates. An especially preferred organo-molybdenum compound is a molybdenum dithiocarbamate. In an embodiment of the present invention any oil-soluble or oil-dispersible molybdenum compound consists of either a molybdenum dithiocarbamate or a molybdenum dithiophosphate or a mixture thereof, as the sole source of molybdenum atoms in the composition.

The molybdenum compound may be mono-, di-, tri- or tetra-nuclear. Di-nuclear and tri-nuclear molybdenum compounds are preferred.

Suitable dinuclear or dimeric molybdenum dialkyldithiocarbamate are represented by the following formula:

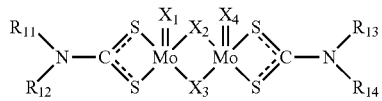

wherein $R_{11}$ to $R_{14}$ independently denote a straight chain, branched chain or aromatic hydrocarbyl group having 1 to 24 carbon atoms; and $X_1$ through $X_4$ independently denote an oxygen atom or a sulfur atom. The four hydrocarbyl groups, $R_{11}$ to $R_{14}$, may be identical or different from one another.

Other suitable molybdenum compounds are organo-molybdenum compounds of the formulae $Mo(R_{15}OCS_2)_4$ and $Mo(R_{15}SCS_2)_4$, wherein $R_{15}$ is an organo group selected from the group consisting of alkyl, aryl, aralkyl and alkoxyalkyl, generally of from 1 to 30 carbon atoms, and preferably 2 to 12 carbon atoms and most preferably alkyl of 2 to 12 carbon atoms. Especially preferred are the dialkyldithiocarbamates of molybdenum.

Suitable tri-nuclear organo-molybdenum compounds include those of the formula $Mo_3S_kL_nQ_z$ and mixtures thereof wherein L are independently selected ligands having organo groups with a sufficient number of carbon atoms to render the compound soluble or dispersible in the oil, n is from 1 to 4, k varies from 4 through 7, Q is selected from the group of neutral electron donating compounds such as water, amines, alcohols, phosphines, and ethers, and z ranges from 0 to 5 and includes non-stoichiometric values. At least 21 total carbon atoms should be present among all the ligands' organo groups, such as at least 25, at least 30, or at least 35 carbon atoms.

The ligands are independently selected from the group of:

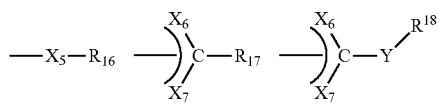

and mixtures thereof; wherein $X_5$, $X_6$, $X_7$, and Y are independently selected from the group of oxygen and sulfur, and wherein $R_{16}$, $R_{17}$, and $R_{18}$ are independently selected from hydrogen and organo groups that may be the same or different. Preferably, the organo groups are hydrocarbyl groups such as alkyl (e.g., in which the carbon atom attached to the remainder of the ligand is primary or secondary), aryl, substituted aryl and ether groups. More preferably, each ligand has the same hydrocarbyl group.

Importantly, the organo groups of the ligands have a sufficient number of carbon atoms to render the compound soluble or dispersible in the oil. For example, the number of carbon atoms in each group will generally range between about 1 to about 100, preferably from about 1 to about 30, and more preferably between about 4 to about 20. Preferred ligands include dialkyldithiophosphate, alkylxanthate, and dialkyldithiocarbamate, and of these dialkyldithiocarbamate is more preferred. Organic ligands containing two or more of the above functionalities are also capable of serving as ligands and binding to one or more of the cores. Those skilled in the art will realize that formation of the compounds of the present invention requires selection of ligands having the appropriate charge to balance the core's charge.

Compounds having the formula $Mo_3S_kL_nQ_z$ have cationic cores surrounded by anionic ligands and are represented by structures such as

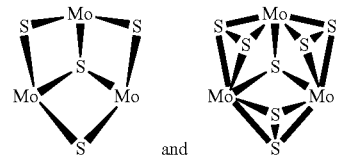

and have net charges of +4. Consequently, in order to solubilize these cores the total charge among all the ligands must be −4. Four mono-anionic ligands are preferred. Without wishing to be bound by any theory, it is believed that two or more tri-nuclear cores may be bound or interconnected by means of one or more ligands and the ligands may be multidentate. This includes the case of a multidentate ligand having multiple connections to a single core. Oxygen and/or selenium may be substituted for sulfur in the core(s).

Oil-soluble or oil-dispersible tri-nuclear molybdenum compounds can be prepared by reacting in the appropriate liquid(s)/solvent(s) a molybdenum source such as $(NH_4)_2Mo_3S_{13} \cdot n(H_2O)$, where n varies between 0 and 2 and includes non-stoichiometric values, with a suitable ligand source such as a tetralkylthiuram disulfide. Other oil-soluble or dispersible tri-nuclear molybdenum compounds can be formed during a reaction in the appropriate solvent(s) of a molybdenum source such as of $(NH_4)_2Mo_3S_{13} \cdot n(H_2O)$, a ligand source such as tetralkylthiuram disulfide, dialkyldithiocarbamate, or dialkyldithiophosphate, and a sulfur abstracting agent such as cyanide ions, sulfite ions, or substituted phosphines. Alternatively, a tri-nuclear molybdenum-sulfur halide salt such as $[M']_2[Mo_3S_7A_6]$, where M' is a counter ion, and A is a halogen such as Cl, Br, or I, may be reacted with a ligand source such as a dialkyldithiocarbamate or dialkyldithiophosphate in the appropriate liquid(s)/solvent(s) to form an oil-soluble or dispersible trinuclear molybdenum compound. The appropriate liquid/solvent may be, for example, aqueous or organic.

In a particularly preferred embodiment, the one or more oil-soluble or dispersible molybdenum-containing compound comprises a tri-nuclear molybdenum compound.

A compound's oil solubility or dispersibility may be influenced by the number of carbon atoms in the ligand's organo groups. Preferably, at least 21 total carbon atoms should be present among all the ligands' organo groups. Preferably, the ligand source chosen has a sufficient number of carbon atoms in its organo groups to render the compound soluble or dispersible in the lubricating oil composition.

Other molybdenum compounds include acidic molybdenum compounds. These compounds will react with a basic nitrogen compound as measured by ASTM test D-664 or D-2896 titration procedure and are typically hexavalent. Included are molybdic acid, ammonium molybdate, sodium molybdate, potassium molybdate, and other alkaline metal molybdates and other molybdenum salts, e.g., hydrogen sodium molybdate, $MoOCl_4$, $MoO_2Br_2$, $Mo_2O_3Cl_6$, molybdenum trioxide or similar acidic molybdenum compounds. Alternatively, the compositions of the present invention can be provided with molybdenum by molybdenum/sulfur complexes of basic nitrogen compounds as described, for example, in U.S. Pat. Nos. 4,263,152; 4,285,822; 4,283,295; 4,272,387; 4,265,773; 4,261,843; 4,259,195 and 4,259,194; and WO 94/06897.

Preferably, the one or more molybdenum-containing compound is present in an amount such as to provide the composition with between 10 and 1,000 ppm by mass of molybdenum, based on the mass of the composition. More preferably, the one or more molybdenum-containing compound is present in an amount such as to provide the composition with between 10 and 500 ppm, for example 50 and 300 ppm by mass of molybdenum, based on the mass of the composition.

Metal-Containing Detergents

The lubricating oil composition of the present invention may include one or more metal-containing detergents. These are well known in the art and widely used in lubricating oils of various types. Examples include oil-soluble neutral or overbased salts of alkali or alkaline earth metals with one or more of the following acidic substances (or mixtures thereof): (1) sulfonic acids, (2) carboxylic acids, (3) salicylic acids, (4) alkyl phenols, (5) sulfurized alkyl phenols. Commonly preferred salts of such acids from the cost-effectiveness, toxicological, and environmental standpoints are the salts of sodium, potassium, lithium, calcium and magnesium.

Oil-soluble neutral metal-containing detergents are those detergents that contain stoichiometrically equivalent amounts of metal in relation to the number of acidic moieties present in the detergent. Thus, in general the neutral detergents will have a low basicity when compared to their overbased counterparts.

The term "overbased" in connection with metallic detergents is used to designate metal salts wherein the metal is present in stoichiometrically larger amounts than the organic radical. The commonly employed methods for preparing the over-based salts involve heating a mineral oil solution of an acid with a stoichiometric excess of a metal neutralizing agent such as the metal oxide, hydroxide, carbonate, bicarbonate, of sulfide at a temperature of about 50° C., and filtering the resultant product. The use of a "promoter" in the neutralization step to aid the incorporation of a large excess of metal likewise is known. Examples of compounds useful as the promoter include phenolic substances such as phenol, naphthol, alkyl phenol, thiophenol, sulfurized alkylphenol, and condensation products of formaldehyde with a phenolic substance; alcohols such as methanol, 2-propanol, octanol, Cellosolve alcohol, Carbitol alcohol, ethylene glycol, stearyl alcohol, and cyclohexyl alcohol; and amines such as aniline, phenylene diamine, phenothiazine, phenyl-beta-naphthylamine, and dodecylamine. A particularly effective method for preparing the basic salts comprises mixing an acid with an excess of a basic alkaline earth metal neutralizing agent and at least one alcohol promoter, and carbonating the mixture at an elevated temperature such as 60 to 200° C.

Examples of common metal-containing detergents used in lubricating oils include, but are not limited to, neutral and overbased salts of such substances as lithium phenates, sodium phenates, potassium phenates, calcium phenates, magnesium phenates, sulfurized lithium phenates, sulfurized sodium phenates, sulfurized potassium phenates, sulfurized calcium phenates, and sulfurized magnesium phenates wherein each aromatic group has one or more aliphatic groups to impart hydrocarbon solubility; lithium sulfonates, sodium sulfonates, potassium sulfonates, calcium sulfonates, and magnesium sulfonates wherein each sulfonic acid moiety is attached to an aromatic nucleus which in turn usually contains one or more aliphatic substituents to impart hydrocarbon solubility; lithium salicylates, sodium salicylates, potassium salicylates, calcium salicylates and magnesium salicylates wherein the aromatic moiety is usually substituted by one or more aliphatic substituents to impart hydrocarbon solubility; the lithium, sodium, potassium, calcium and magnesium salts of hydrolyzed phosphosulfurized olefins having 10 to 2,000 carbon atoms or of hydrolyzed phosphosulfurized alcohols and/or aliphatic-substituted phenolic compounds having 10 to 2,000 carbon atoms; lithium, sodium, potassium, calcium and magnesium salts of aliphatic carboxylic acids and aliphatic substituted cycloaliphatic carboxylic acids; and many other similar alkali and alkaline earth metal salts of oil-soluble organic acids. Mixtures of neutral or over-based salts of two or more different alkali and/or alkaline earth metals are used. Likewise, neutral and/or overbased salts of mixtures of two or more different acids (e.g. one or more overbased calcium phenates with one or more overbased calcium sulfonates) are used.

Methods for the production of oil-soluble neutral and overbased metallic detergents and alkaline earth metal-containing detergents are well known to those skilled in the art, and are extensively reported in the patent literature.

Metal-containing detergents may be boronated. Methods for preparing boronated metallic detergents are well known to those skilled in the art, and are extensively reported in the patent literature.

When present, preferably metal-containing detergents are present in the lubricating oil composition of the present invention in amounts such as to provide the composition with between 10 and 1000 ppm by mass of metal, based on the mass of the composition. More preferably, the lubricating oil composition of the present invention contains one or more metal-containing detergents in amounts such as to provide the composition with between 10 and 500 ppm, for example between 50 and 300 ppm, by mass of metal, based on the mass of the composition. In preferred embodiments, the metal-containing detergent comprises a calcium-containing detergent.

Oil-Soluble Phosphorus Compounds

The lubricating oil composition of the present invention may include one or more oil-soluble phosphorus compounds. When the lubricating oil composition is an automatic transmission fluid it is preferred that the fluid further comprises one or more oil-soluble phosphorus compounds.

Oil-soluble phosphorus compound may be any suitable type, and may be a mixture of different compounds. Typically, such compounds are used to provide anti-wear protection. The only limitation is that the material be oil-soluble so as to permit its dissolution and transport within the automatic transmission fluid to its site of action. Examples of suitable phosphorus compounds are: phosphites and thiophosphites (mono-alkyl, di-alkyl, tri-alkyl and hydrolyzed or partially hydrolyzed analogues thereof); phosphates and thiophosphates; amines treated with inorganic phosphorus compounds such as phosphorus acid, phosphoric acid or their thio-analogues; amine phosphates. Examples of particularly suitable phosphorus compounds, particularly when the composition is an automatic transmission fluid, include the mono-, di- and tri-alkyl phosphites represented by the structures:

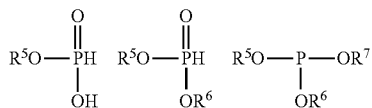

and the tri-alkyl phosphate represented by the structure;

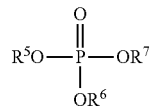

wherein groups $R^5$, $R^6$ and $R^7$ may be the same or different and may be hydrocarbyl groups as defined hereinabove or aryl groups such as phenyl or substituted phenyl. Additionally, or alternatively, one or more of the oxygen atoms in the above structures may be replaced by a sulfur atom to provide other suitable phosphorus compounds.

Preferred oil-soluble phosphorus compounds are those where groups $R^5$ and $R^6$ and $R^7$ (when present) are linear alkyl groups such as butyl, octyl, decyl, dodecyl, tetradecyl and octadecyl and in a more preferred embodiment, the corresponding groups containing a thioether linkage. Branched groups are also suitable. Non-limiting examples of compounds include di-butyl phosphite, tri-butyl phosphite, di-2-ethylhexyl phosphite, tri-lauryl phosphite and tri-lauryl-tri-thio phosphite and the corresponding phosphites where the groups $R^5$ and $R^6$ and $R^7$ (when present) are 3-thio-heptyl, 3-thio-nonyl, 3-thio-undecyl, 3-thio-tridecyl, 5-thio-hexadecyl and 8-thio-octadecyl. The most preferred alkyl-phosphites are those described in U.S. Pat. Nos. 5,185,090 and 5,242,612.

While any effective amount of oil-soluble phosphorus compound may be used, typically the amount used will be such as to provide the lubricating oil composition, particularly an automatic transmission fluid with from 10 to 1000, preferably from 100 to 750, more preferably from 200 to 500 parts per million by mass (ppm) of elemental phosphorus, per mass of the composition or fluid.

Corrosion Inhibitors

Corrosion inhibitors are used to reduce the corrosion of metals and are often alternatively referred to as metal deactivators or metal passivators. Suitable corrosion inhibitors are nitrogen and/or sulfur containing heterocyclic compounds such as triazoles (e.g. benzotriazoles), substituted thiadiazoles, imidazoles, thiazoles, tetrazoles, hydroxyquinolines, oxazolines, imidazolines, thiophenes, indoles, indazoles, quinolines, benzoxazines, dithiols, oxazoles, oxatriazoles, pyridines, piperazines, triazines and derivatives of any one or more thereof. A preferred corrosion inhibitor is a benzotriazole represented by the structure:

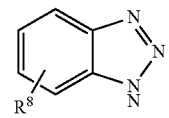

wherein $R^8$ is absent or is a $C_1$ to $C_{20}$ hydrocarbyl or substituted hydrocarbyl group which may be linear or branched, saturated or unsaturated. It may contain ring structures that are alkyl or aromatic in nature and/or contain heteroatoms such as N, O or S. Examples of suitable compounds are benzotriazole, alkyl-substituted benzotriazoles (e.g. tolyltriazole, ethylbenzotriazole, hexylbenzotriazole, octylbenzotriazole, etc.), aryl substituted benzotriazole and alkylaryl- or arylalkyl-substituted benzotriazoles. Preferably, the triazole is a benzotriazole or an alkylbenzotriazole in which the alkyl group contains from 1 to about 20 carbon atoms, preferably 1 to about 8 carbon atoms. Benzotriazole and tolyltriazole are particularly preferred.

Another preferred corrosion inhibitor is a substituted thiadiazoles represented by the structure:

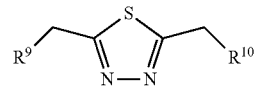

wherein $R^9$ and $R^{10}$ are independently hydrogen or a hydrocarbon group, which group may be aliphatic or aromatic, including cyclic, alicyclic, aralkyl, aryl and alkaryl. These substituted thiadiazoles are derived from the 2,5-dimercapto-1,3,4-thiadiazole (DMTD) molecule. Many derivatives of DMTD have been described in the art, and any such compounds can be included in the transmission fluid used in the present invention. U.S. Pat. Nos. 2,719,125, 2,719,126 and 3,087,937 describe the preparation of various 2,5-bis-(hydrocarbon dithio)-1,3,4-thiadiazoles.

Also useful are other derivatives of DMTD. These include the carboxylic esters wherein $R^9$ and $R^{10}$ are joined to the sulfide sulfur atom through a carbonyl group. Preparation of these thioester containing DMTD derivatives is described in U.S. Pat. No. 2,760,933. DMTD derivatives produced by condensation of DMTD with alpha-halogenated aliphatic monocarboxylic carboxylic acids having at least 10 carbon atoms is described in U.S. Pat. No. 2,836,564. This process produces DMTD derivatives wherein $R^9$ and $R^{10}$ are HOOC—CH($R^{19}$)— ($R^{19}$ being a hydrocarbyl group). DMTD derivatives further produced by amidation or esterification of these terminal carboxylic acid groups are also useful. The preparation of 2-hydrocarbyldithio-5-mercapto-1,3,4-thiadiazoles is described in U.S. Pat. No. 3,663,561.

A preferred class of DMTD derivatives are the mixtures of the 2-hydrocarbyldithio-5-mercapto-1,3,4-thiadiazoles and the 2,5-bis-hydrocarbyldithio-1,3,4-thiadiazoles. Such mixtures are sold under the trade name Hitec® 4313.

Corrosion inhibitors can be used in any effective amount however they are typically used in amounts from about 0.001 to 5.0% by mass based on the mass of the lubricating oil composition, preferably from 0.005 to 3.0% by mass, most preferably from 0.01 to 1.0 mass %.

Other additives known in the art may be added to the lubricating oil compositions of the present invention. These include other anti-wear agents, extreme pressure additives, anti-oxidants, viscosity modifiers and the like. They are typically disclosed in, for example, "Lubricant Additives" by C. V. Smallheer and R. Kennedy Smith, 1967, pp 1-11.

The unsymmetrical bis-succinimide of structure (I) and any co-additives may be added separately to the oil of lubricating viscosity to form the lubricating oil composition or more conveniently, they may be added to the oil as an additive concentrate or 'additive package' containing the required compounds dissolved or dispersed in a carrier fluid or solvent. Accordingly, in a further aspect, the present invention provides an additive concentrate comprising between 0.1 and 20% by mass of an unsymmetrical bis-succinimide of the structure (I), preferably between 1 and 15% by mass, and optionally one or more other additives, the remainder of the concentrate being a carrier fluid or solvent.

As will be well known to those skilled in the art, with regard to the additive concentrate, the carrier fluid or solvent may be any suitable fluid in which the additive may be readily dissolved or dispersed and which is also compatible with the oil of lubricating viscosity used to form the lubricating oil composition or automatic transmission fluid. Examples include oils of lubricating viscosity as described hereinabove and solvents such as those sold under the Solvesso tradename.

Typically, the additive concentrate will be added to an oil of lubricating viscosity to form the lubricating oil composition or automatic transmission fluid in an amount of between 5 and 50% by mass, based on the mass of the composition. Preferably, the additive concentrate will be added to an oil of lubricating viscosity to form the automatic transmission fluid in an amount of between 5 and 20% by mass, based on the mass of the composition.

The invention will now be described by way of non-limiting example only.

EXAMPLE 1

Synthesis of an Unsymmetrical Bis-Succinimide of Structure (I)

A one liter round-bottomed, 4-necked flask was fitted with a thermometer, mechanical stirrer, nitrogen sweep, Dean-Starke trap, and a water-cooled condenser. The flask was charged with a 50:50 molar mixture of (i) a polyisobutenyl-substituted succinic anhydride where the polyisobutenyl group had a number average molecular weight of 950 and (ii) a hydrocarbyl-substituted succinic anhydride where the hydrocarbyl group had a number average molecular weight of 2,300 and was made by the metallocene-catalysed polymerisation of a mixture of 1-octene, 1-decene and 1-dodecene. The flask was heated to 130° C. under stirring. A commercial mixture of polyethylene polyamines having an average of six nitrogen atoms per molecule was then added slowly to the flask via an addition funnel in an amount equivalent to provide one mole of primary amine per mole of anhydride groups. The temperature of the reaction mixture was raised to 165° C. and held there for 3 hours. This stage was followed by a one hour nitrogen sparge to remove residual water. After cooling, the reaction yielded a product having a nitrogen content of 2.2% by mass.

EXAMPLE 2

Symmetrical Bis-Succinimide Made Using Polyisobutylene (PIB)

Example 1 was repeated using the same mixture of polyethylene polyamines but only reactant (i): the polyisobutenyl-substituted succinic anhydride where the polyisobutenyl group had a number average molecular weight of 950. The product obtained had a nitrogen content of 3.46% by mass.

EXAMPLE 3

Synthesis of a Symmetrical Bis-Succinimide Made Using mPAO

Example 1 was repeated using the same mixture of polyethylene polyamines but only reactant (ii): the hydrocarbyl-substituted succinic anhydride where the hydrocarbyl group had a number average molecular weight of 2,300 and was made by the metallocene-catalysed polymerisation of a mixture of 1-octene, 1-decene and 1-dodecene. The product obtained had a nitrogen content of 1.56% by mass.

Four automatic transmission fluid compositions were prepared as detailed in Table 1. Three compositions were comparative examples: 'Comp. 1' did not contain any of the bis-succinimides of Examples 1-3; 'Comp. 2' contained only the symmetrical bis-succinimide of Example 2, made using polyisobutylene (PIB); and 'Comp. 3' contained a combination of both the symmetrical bis-succinimides of Examples 2 and 3. Ex. 4 is an example of the present invention as it contains only the un-symmetrical bis-succinimide of Example 1.

TABLE 1

| Component/wt % | Comp. 1 | Comp. 2 | Comp. 3 | Ex. 4 |
| --- | --- | --- | --- | --- |
| Example 1 | | | | 2.0 |
| Example 2 | | 2.0 | 1.52 | |
| Example 3 | | | 1.40 | |
| Additive package[1] | 10.0 | 8.0 | 7.1 | 8.0 |
| Base Oil[2] | 90.0 | 90.0 | 90.0 | 90.0 |
| Properties | | | | |
| Kv 100[3] (cSt) | 3.50 | 3.49 | 3.54 | 3.54 |
| Kv 40[3] (cSt) | 14.30 | 14.90 | 15.05 | 14.93 |

[1]The Additive Package was a conventional additive package typically found in automatic transmission fluid compositions. The same package was used in all examples. It contained a conventional borated dispersant, an oil-soluble phosphorus anti-wear compound, a calcium sulphonate detergent, anti-oxidants, corrosion inhibitors and friction modifiers.
[2]The base oil was 'Yubase 3' which is an API Group III mineral oil.
[3]Kinematic viscosity was determined according to ASTM D445.

Friction Performance Data

Friction measurements were made on each fluid from Table 1 on an SAE No. 2 test machine using method JASO M348. The test clutch assembly used steel plates and NW461E fibre plates. Static friction (μS) and dynamic friction (μD) were measured after 5000 cycles. Results are shown in Table 2 below.

TABLE 2

| Friction | Comp. 1 | Comp. 2 | Comp. 3 | Ex. 4 |
|---|---|---|---|---|
| μS | 0.0806 | 0.1251 | 0.1159 | 0.1152 |
| μD | 0.1264 | 0.1383 | 0.1398 | 0.1392 |

For optimum performance in a fluid used in an automatic transmission, μS should be between 0.100 and 0.115 and μD should be above 0.130. Comp. 1, which did not contain any of the bis-succinimides of Examples 1-3, had both static and dynamic friction which were too low. For Comp. 2, which contained the conventional symmetrical bis-succinimide made using PIB, dynamic friction was good but static friction was too high. The fluid according to the present invention, Ex. 4, had both good static friction and good dynamic friction. Comp. 3 also had both good static friction and good dynamic friction but importantly, as shown in Table 1, Comp. 3 contained a total of 2.92 mass % of dispersant (combination of Examples 2 and 3) whereas Ex. 4 contained only 2 mass %.

Fatigue Testing

A modified 4-ball test rig was used. AXK1105 needle bearings were run against two FTRE-2542 races at the conditions shown in the table below. Fresh bearings and races were used for each test and each test fluid was run until pitting occurred. The number of cycles before pitting was recorded with better fatigue lifetimes being evidenced by a greater number of cycles before pitting.

|  |  |  | Roller | Race |
|---|---|---|---|---|
| Test Pieces | No. of needle bearings |  | 18 |  |
|  | Radius | mm | 1 | — |
|  | Surface roughness | μm | 0.05 | 0.2 |
| Test conditions | Contact pressure | Gpa | 1.94 | |
|  | Contact length | mm | 4.71 | |
|  | Shaft revolutions | rpm | 2095 | |
|  | Entrainment speed | ms$^{-1}$ | 1.84 | |
|  | Sliding speed | ms$^{-1}$ | 0.20 | |
|  | Slide-to-roll ratio | % | 11 | |
|  | Oil temperature | ° C. | 120 | |
|  | Oil volume | cm$^3$ | 50 | |
|  | Contact cycles | hr$^{-1}$ | 2.11 × 10$^6$ | 1.13 × 10$^6$ |

Fluid 'Comp 2' from the table above (containing only the conventional symmetrical bis-succinimide made using PIB) ran for an average of 16.8 million cycles before pitting was observed. Contrastingly, the oil containing the unsymmetrical bis-succinimide of the present invention (fluid 'Ex 4' from the table above) ran for an average of 28.0 million cycles prior to pitting. This was nearly double the wear lifetime of fluid 'Comp 2', illustrating a significant advantage for the fluid according to the present invention.

What is claimed is:

1. A lubricating oil composition comprising a major amount of an oil of lubricating viscosity and a minor amount of an unsymmetrical bis-succinimide dispersant, or a mixture of unsymmetrical bis-succinimide dispersants, of the structure (I):

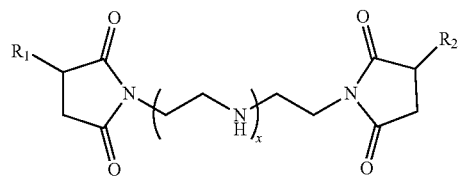

wherein one of $R_1$ and $R_2$, is a polyisobutylene group having a number average molecular weight of 400 to 5,000, as determined by GPC with reference to linear polystyrene standards, and the other of $R_1$ and $R_2$ is a hydrocarbon group made by the metallocene-catalysed polymerisation of an α-olefin feedstock, and wherein x is from 5 to 8 and is the same for all molecules of structure (I) or an average of all molecules of structure (I) in a mixture of molecules of structure (I).

2. A lubricating oil composition according to claim 1, wherein the α-olefin feedstock comprises 1-butene, 1-pentene, 1-hexene, 1-heptene, 1-octene, 1-nonene, 1-decene, 1-undecene, 1-dodecene, 1-tetradecene and 1-octadecene and any mixtures of two or more of these α-olefins.

3. A lubricating oil composition according to claim 2, wherein the α-olefin feedstock consists essentially of 1-octene, 1-decene, 1-dodecene or any mixture thereof.

4. A lubricating oil composition according to claim 1, wherein the hydrocarbon group made by the metallocene-catalysed polymerisation of an α-olefin feedstock has a number average molecular weight of 300 to 20,000, as determined by GPC with reference to linear polystyrene standards.

5. A lubricating oil composition according to claim 1, wherein the unsymmetrical bis-succinimide dispersant of the structure (I) is present in the lubricating oil composition in an amount of from 0.01 to 20% by mass, based on the mass of the composition.

6. A lubricating oil composition according to claim 1, which is an automatic transmission fluid.

7. A lubricating oil composition according to claim 6, further comprising as a friction modifier the product of an isomerized alkenyl-substituted succinic anhydride and a polyamine, the product having structure (II):

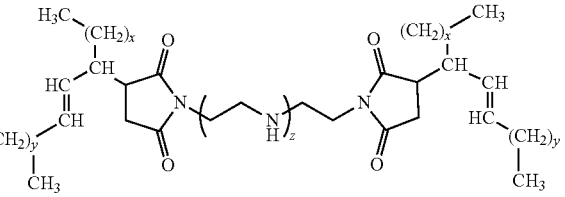

wherein x and y are independently zero or integers from 1 to 30, where x+y is from 1 to 30, and z is zero or an integer from 1 to 10.

8. A lubricating oil composition according to claim 1, further comprising one or more co-additives in addition to the unsymmetrical bis-succinimide dispersant of the structure (I).

9. A lubricating oil composition according to claim 7, further comprising one or more co-additives in addition to the unsymmetrical bis-succinimide dispersant of the structure (I) and the friction modifier product of an isomerized alkenyl-substituted succinic anhydride and a polyamine having structure (II).

10. A method of making an unsymmetrical bis-succinimide dispersant, or a mixture of unsymmetrical bis-succinimide dispersants, of the structure (I):

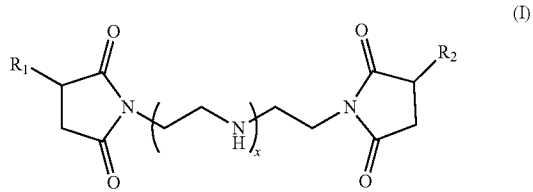

wherein one of $R_1$ and $R_2$ is a polyisobutylene group having a number average molecular weight of 400 to 5,000, as determined by GPC with reference to linear polystyrene standards, and the other of $R_1$ and $R_2$ is a hydrocarbon group made by the metallocene-catalysed polymerisation of an α-olefin feedstock, and wherein x is from 5 to 8 and is the same for all molecules of structure (I) or an average of all molecules of structure (I) in a mixture of molecules of structure (I);

the method comprising:
  (a) forming or otherwise providing a mixture of (i) a polyisobutenyl-substituted succinic anhydride, the polyisobutylene group having a number average molecular weight of 400 to 5,000, as determined by GPC with reference to linear polystyrene standards, and (ii) a hydrocarbyl-substituted succinic anhydride where the hydrocarbyl substituent is a hydrocarbon group made by the metallocene-catalysed polymerisation of an α-olefin feedstock; and
  (b) reacting the mixture from step (a) with a polyethylene polyamine or a mixture of polyethylene polyamines.

11. A method according to claim 10, wherein the α-olefin feedstock comprises 1-butene, 1-pentene, 1-hexene, 1-heptene, 1-octene, 1-nonene, 1-decene, 1-undecene, 1-dodecene, 1-tetradecene and 1-octadecene and any mixtures of two or more of these α-olefins.

12. A method according to claim 10, wherein the α-olefin feedstock consists essentially of 1-octene, 1-decene, 1-dodecene or any mixture thereof.

13. A method according to claim 10, wherein in step (a), the mixture of component (i) and component (ii) contains equal molar quantities of (i) and (ii).

14. A method of increasing the fatigue lifetime between two or more contacting surfaces moving relative to one another, the method comprising lubricating the contacting surfaces with a lubricating oil composition according to claim 1.

15. A lubricant oil composition according to claim 1, further comprising one or more antiwear agents, wherein the one or more antiwear agents consist essentially of the reaction products of a beta-hydroxy thioether, an organic phosphite ester, and optionally a nucleophilic reactant capable of reacting with an episulfonium cation.

16. A lubricant oil composition according to claim 8, wherein the one or more co-additives further comprises one or more antiwear agents, wherein the one or more antiwear agents consist essentially of the reaction products of a beta-hydroxy thioether, an organic phosphite ester, and optionally a nucleophilic reactant capable of reacting with an episulfonium cation.

17. A lubricant oil composition according to claim 9, wherein the one or more co-additives further comprises one or more antiwear agents, wherein the one or more antiwear agents consist essentially of the reaction products of a beta-hydroxy thioether, an organic phosphite ester, and optionally a nucleophilic reactant capable of reacting with an episulfonium cation.

18. A lubricant oil composition comprising an unsymmetrical bis-succinimide dispersant made according to the method of claim 10.

19. A lubricant oil composition according to claim 18, further comprising one or more antiwear agents, wherein the one or more antiwear agents consist essentially of the reaction products of a beta-hydroxy thioether, an organic phosphite ester, and optionally a nucleophilic reactant capable of reacting with an episulfonium cation.

20. A method of increasing the fatigue lifetime between two or more contacting surfaces moving relative to one another, the method comprising lubricating the contacting surfaces with a lubricating oil composition according to claim 15.

* * * * *